(12) United States Patent
Zhang et al.

(10) Patent No.: US 7,415,294 B1
(45) Date of Patent: Aug. 19, 2008

(54) HANDS-FREE VOICE COMMUNICATION APPARATUS WITH INTEGRATED SPEAKERPHONE AND EARPIECE

(75) Inventors: Ming Zhang, Cupertino, CA (US); Yen-Son Paul Huang, Saratoga, CA (US)

(73) Assignee: Fortemedia, Inc., Cupertino, CA (US)

( * ) Notice: Subject to any disclaimer, the term of this patent is extended or adjusted under 35 U.S.C. 154(b) by 222 days.

(21) Appl. No.: 11/103,729

(22) Filed: Apr. 11, 2005

Related U.S. Application Data

(60) Provisional application No. 60/562,148, filed on Apr. 13, 2004.

(51) Int. Cl.
*H04M 1/00* (2006.01)

(52) U.S. Cl. .................. 455/575.6; 455/550.1

(58) Field of Classification Search ............... 455/576.6, 455/550.1, 569.1, 78, 79, 103, 104, 568, 455/115, 126, 67.1, 500, 463, 59, 51, 569, 455/132, 133, 174.1, 194.1, 3.06, 149, 191.3, 455/197.1, 575.6
See application file for complete search history.

(56) References Cited

U.S. PATENT DOCUMENTS

| | | | |
|---|---|---|---|
| 6,434,407 B1 * | 8/2002 | Cook | 455/569.1 |
| 6,729,726 B2 * | 5/2004 | Miller et al. | 351/158 |
| 7,069,061 B2 * | 6/2006 | Gammon et al. | 455/575.1 |
| 2004/0264610 A1 * | 12/2004 | Marro et al. | 375/347 |
| 2005/0014537 A1 * | 1/2005 | Gammon et al. | 455/575.1 |
| 2005/0037823 A1 * | 2/2005 | Seshadri et al. | 455/575.6 |

* cited by examiner

*Primary Examiner*—Melody Mehrpour
(74) *Attorney, Agent, or Firm*—Thomas, Kayden, Horstemeyer & Risley

(57) ABSTRACT

A hands-free voice communication apparatus with integrated speakerphone and earpiece is described. The speakerphone includes a loudspeaker and zero, one or multiple microphones. The earpiece includes a small loudspeaker, one or more microphones, a wireless module, and a digital signal processing (DSP) module. The hands-free device support hands-free voice communication via the speakerphone or the earpiece. The earpiece is functional when removed from the speakerphone case and may be used for voice communication with privacy. When the earpiece is placed back in the speakerphone case, the speakerphone is functional and may be used for voice communication with convenience. The DSP module performs digital signal processing for both the earpiece and the speakerphone, e.g., using different sets of parameters. The speakerphone may be a standalone device or may be part of a communication device. The wireless module communicates with the communication device, which provide end-to-end communication with a far-end user.

28 Claims, 6 Drawing Sheets

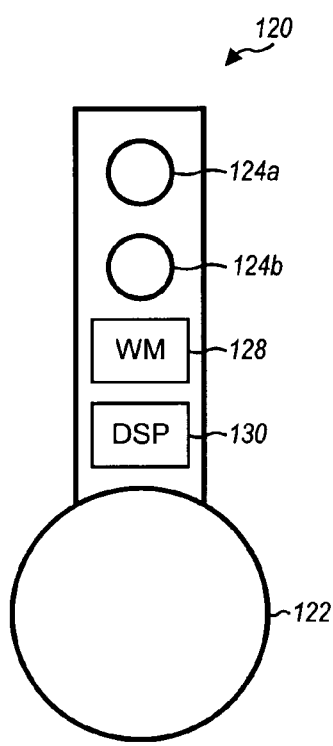 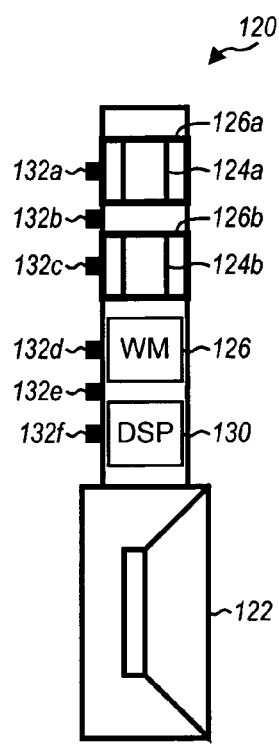 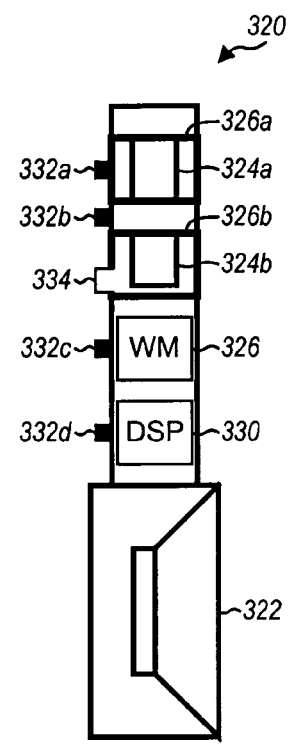
*FIG. 5*  *FIG. 6*  *FIG. 7*

HANDS-FREE VOICE COMMUNICATION APPARATUS WITH INTEGRATED SPEAKERPHONE AND EARPIECE

CROSS-REFERENCES TO RELATED APPLICATIONS

This application claims the benefit of provisional U.S. Application Ser. No. 60/562,148, entitled "Earpiece and Speakerphone Integrated Apparatus with Different Wireless Communication Channels," filed Apr. 13, 2004, which is incorporated herein by reference in its entirety for all purposes.

BACKGROUND

The present invention relates generally to communication, and more specifically to a hands-free voice communication apparatus.

Hands-free voice communication devices are commonly used for many applications such as speakerphone, hands-free car kit, teleconferencing system, cellular phone, hands-free voice recognition device, and so on, and in various environments such as car, home, office, hotel, and so on. A hands-free device allows a near-end user to speak into one or more microphones placed at some distance away from the near-end user and to listen to sound from a far-end user via a loudspeaker also placed away from the near-end user. Hands-free devices are thus convenient and comfortable to use, and are also safer to use than hands-on or handheld devices in certain situations, e.g., when driving a car.

A hands-free device typically supports hands-free voice communication via a speakerphone that includes a loudspeaker and one or more microphones. When the hands-free device is small in size, the close proximity of the loudspeaker to the microphones can cause some major problems. For example, when a speech signal from the far-end user is outputted from the loudspeaker, a portion of this speech signal may be reflected back to the microphones and transmitted back to the far-end user. This acoustic disturbance is referred to as echo. In general, users are annoyed by hearing their own voice delayed, for example, by the path of the system. In certain instances, acoustic shock or howling may be caused by the speakerphone becoming unstable due to the microphones picking up reflections of the acoustic signal emitted by the loudspeaker.

Hands-free devices are described in various literatures including U.S. Patent Application Serial Nos. US 2003/0157973 and US 2004/0033820. Application Serial No. US 2003/0157973 describes installing an earpiece inside a cellular phone and using a switch to select between the cellular phone and the earpiece. US 2003/0157973 does not describe a speakerphone feature for the cellular phone. Application Serial No. US 2004/0033820 describes a handset that communicates via infrared with a hands-free kit having an earpiece. However, US 2004/0033820 does not address integration of a speakerphone.

As can be seen, a hands-free voice communication device that can effectively provide hands-free communication is highly desirable.

SUMMARY

Various embodiments of a hands-free voice communication apparatus with integrated speakerphone and earpiece are described herein. The speakerphone includes a loudspeaker and zero, one or multiple microphones. The loudspeaker is disposed within a loudspeaker chamber that is formed within a speakerphone case. If multiple microphones are present for the speakerphone, then one or more microphones may be used as the main microphone(s), and one or more remaining microphones may be used as the reference microphone(s). Each microphone is mounted in a microphone boot that is formed with an acoustic opaque resilient material. Each microphone may be an omni-directional microphone or a directional microphone. The speakerphone further includes a power amplifier for the loudspeaker, a main battery, a slot for holding the earpiece, and pin connectors to interconnect components of the speakerphone to components of the earpiece.

The earpiece includes a small loudspeaker, one or more microphones, a wireless module (e.g., a Bluetooth module), and a digital signal processing (DSP) module. If multiple microphones are present on the earpiece, then one or more microphones may be used as the main microphone(s), and one or more remaining microphones may be used as the reference microphone(s). An opening may be formed for each reference microphone to receive sound from the loudspeaker in the speakerphone. The earpiece is mounted in the slot formed within the speakerphone case.

The hands-free device support hands-free voice communication via one of two mechanisms—the speakerphone and the earpiece. The earpiece is functional when removed from the speakerphone case. The earpiece may be placed on a user's ear and used for voice communication with privacy. The speakerphone is functional when the earpiece is placed back in the speakerphone case. The earpiece may also be used as an earpiece or a speakerphone via a mode switch. The speakerphone may be used for voice communication with convenience. The DSP module performs digital signal processing for both the earpiece and the speakerphone, e.g., using different sets of parameters to account for the difference in the characteristics of the speakerphone and earpiece.

The speakerphone may be a standalone device that is used with a wireless or wireline communication device. A standalone device is a device may be used independently (e.g., even without earpiece). Alternatively, the speakerphone may be part of the communication device. In any case, the communication device provides end-to-end communication between a near-end user and a far-end user via one or more communication channels. The wireless module in the earpiece is used to communicate with the communication device. When the earpiece is removed from the speakerphone case, the wireless module provides communication between the earpiece and the communication device. When the earpiece is placed back in the speakerphone case, the wireless module provides communication between the speakerphone and the communication device.

Various other aspects, embodiments, and features of the invention are also provided, as described in further detail below.

BRIEF DESCRIPTION OF THE DRAWINGS

FIGS. 5 and 6 show front and side views, respectively, of the earpiece for the hands-free apparatus in FIG. 1.

FIG. 7 shows a front view of the earpiece for the hands-free apparatus in FIG. 3.

DETAILED DESCRIPTION

The hands-free voice communication apparatus may be implemented in various manners. For clarity, three specific embodiments of the hands-free apparatus are described below. In one embodiment, the hands-free apparatus includes a standalone speakerphone with two microphones. In a second embodiment, the hands-free apparatus includes a speakerphone without any microphone. In a third embodiment, the hands-free apparatus employs a handset as a speakerphone.

The hands-free apparatus may be a part of and/or may be used together with various wireless and wireline communications devices such as a cellular phone (which is often called a handset), a cordless phone, a wireless personal digital assistant (PDA), a walkie-talkie, a personal computer (PC), and other communication devices with wireless or wireline connection to the hands-free apparatus. The communication between the hands-free apparatus and the communication device may be via Bluetooth, IEEE 802.11 (which is also called a Wi-Fi), a cordless phone channel, other wireless protocols, and so on.

Figure 1:
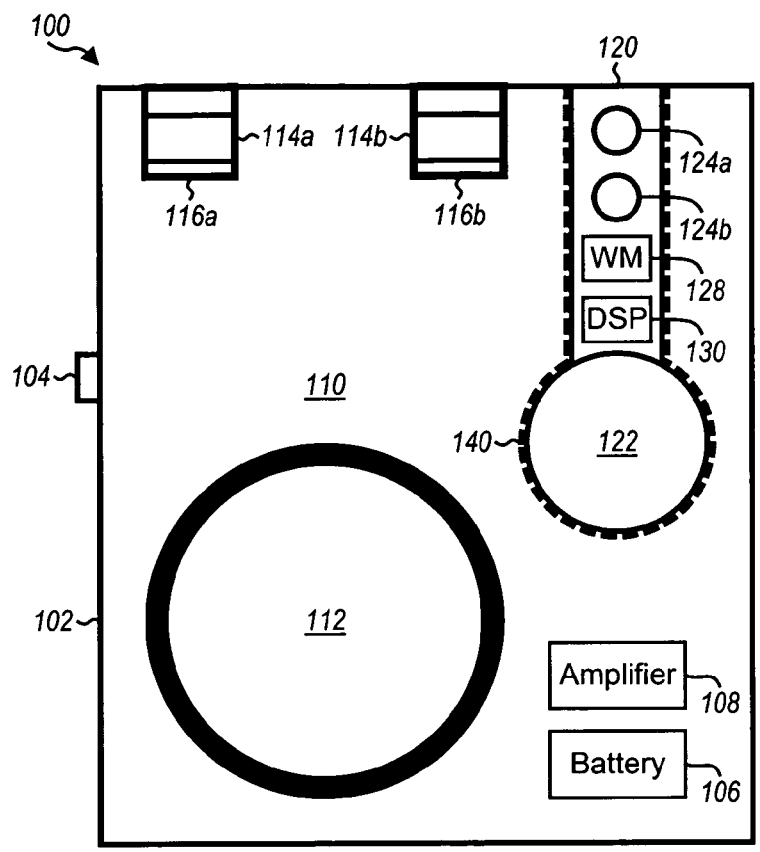
FIGS. 1 and 2 show front views of a hands-free voice communication apparatus with a standalone speakerphone having two microphones and with an earpiece mounted and removed, respectively.

FIG. 1 shows a front view of an embodiment of a hands-free voice communication apparatus 100. Apparatus 100 includes a standalone speakerphone 110, an earpiece 120, an on/off button 104 to power on and off apparatus 100, a main battery 106, a power amplifier 108, and other pertinent components, all of which are mounted within or on a speakerphone case 102.

Speakerphone 110 includes a loudspeaker 112 and two microphones 114a and 114b, which are placed at different locations relative to loudspeaker 112. Microphone 114b may be located closer to loudspeaker 112 than microphone 114a, or both microphones may be placed at approximately the same distance from loudspeaker 112. Loudspeaker 112 may be mounted in speakerphone case 102 with an acoustic opaque resilient material. This material reduces vibration from loudspeaker 112 to speakerphone case 102 but does not alter the acoustic signal from the loudspeaker. Loudspeaker 112 may also be mounted within a loudspeaker chamber (not visible in FIG. 1) that is formed within speakerphone case 102. This chamber may be formed specifically to house loudspeaker 112 and to enhance the loudspeaker's volume and quality.

Microphones 114a and 114b are mounted inside microphone boots 116a and 116b, respectively. For the embodiment shown in FIG. 1, microphones 114a and 114b face the same direction, which is the top of the drawing page. Microphone boots 116a and 116b may be made of acoustic opaque resilient material. Microphone 114a is used as a main microphone and may be either an omni-directional microphone or a directional microphone that may have any beam pattern. For example, a directional microphone may be a cardioid microphone having a heart-shaped beam pattern. Microphone 114b is used as a reference microphone and may be an omni-directional microphone. An opening (not shown in FIG. 1) may be formed in microphone boot 116b at the back of reference microphone 114b to receive sound coming from the loudspeaker chamber. The sound picked up by reference microphone 114b is used for echo cancellation so that only a small amount of sound emitting from loudspeaker 120 is sent back to a far-end user.

Earpiece 120 includes a small loudspeaker 122, two microphones 124a and 124b, a wireless module (WM) 128, a DSP module 130, and a small-size battery (not shown in FIG. 1). Microphone 124a may be used as a main microphone, and microphone 124b may be used as a reference microphone. Microphones 124a and 124b may each be an omni-directional microphone or a directional microphone. Wireless module 128 provides wireless communication for apparatus 110 with a communication device. DSP module 130 may include (1) a digital signal processor that performs signal processing and/or (2) other circuitry that performs other pertinent functions. An embodiment of DSP module 130 is described below. Earpiece 120 is mounted snugly in a slot 140 that is formed on speakerphone case 102 and is electrically coupled to loudspeaker 112, microphones 114a and 114b, and main battery 106 within speakerphone case 102.

A near-end user may communicate using speakerphone 110 or earpiece 120. In a speakerphone mode, the user communicates using speakerphone 110 when earpiece 120 is placed in slot 140. In the speakerphone mode, loudspeaker 112 and microphones 114a and 114b are functional, and DSP module 130 performs digital signal processing in accordance with a first set of parameters that can more effectively deal with higher loudspeaker volume and far field pickup. Wireless module 128 and DSP module 130 within earpiece 120 are electrically coupled to loudspeaker 112, microphones 114a and 114b, and main battery 106 inside speakerphone case 102. In an earpiece mode, the user communicates using earpiece 120 by removing the earpiece from slot 140. In the earpiece mode, DSP module 130 performs digital signal processing in accordance with a second set of parameters that can provide better quality for this mode. For both the speakerphone and earpiece modes, wireless module 128 communicates with the communication device that provides end-to-end communication with the far-end user. The communication device may be a cellular phone, a cordless phone, a wireless PDA, a walkie-talkie, a PC coupled to a network, and so on.

A single DSP module 130 may be installed in earpiece 120 and used for both the speakerphone mode and the earpiece mode. Alternatively, a separate DSP module may be installed in speakerphone case 102 and used to provide enhanced performance for the speakerphone mode.

Figure 2:
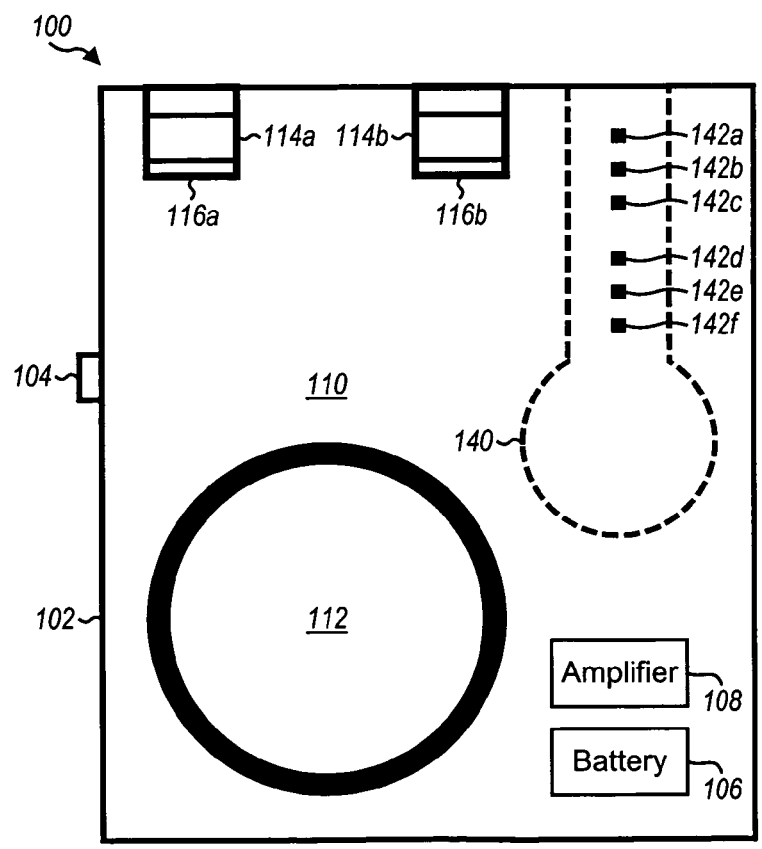

FIG. 2 shows a front view of an embodiment of apparatus 100 with earpiece 120 removed from slot 140. Five pin connectors 142a through 142e are used to electrically couple wireless module 128 and DSP module 130 within earpiece 120 to loudspeaker 112, microphones 114a and 114b, main battery 106, and circuit ground, respectively, within speakerphone case 102. Pin connector 142f is used to switch between the first set of parameters for the speakerphone mode and the second set of parameters for the earpiece mode.

Figure 3:
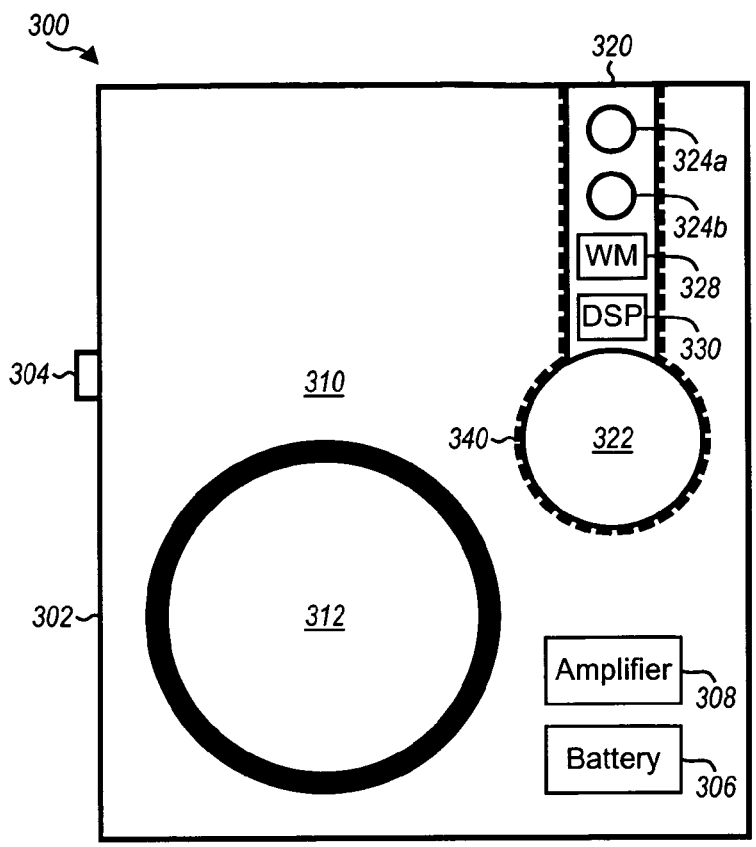
FIGS. 3 and 4 show front views of a hands-free voice communication apparatus with a speakerphone having no microphones and with an earpiece mounted and removed, respectively.

FIG. 3 shows a front view of an embodiment of a hands-free voice communication apparatus 300. Apparatus 300 includes a speakerphone 310 without microphones, an earpiece 320, an on/off button 304, a main battery 306, a power amplifier 308, and other pertinent components, all of which are mounted within or on a speakerphone case 302. Apparatus 300 is similar to apparatus 100 in FIG. 1, albeit without microphones 114a and 114b, microphone boots 116a and 116b, and related wires. Speakerphone 310 includes a loudspeaker 312 but no microphones. Earpiece 320 is the same as earpiece 120 in FIG. 1 and includes a small loud speaker 322, two microphones 324a and 324b, a wireless module 328, and a DSP module 330.

A near-end user may communicate using speakerphone 310 or earpiece 320. In the speakerphone mode, the user communicates using loudspeaker 312 of speakerphone 310 and microphones 324a and 324b of earpiece 320. In the earpiece mode, the user communicates using loudspeaker 322 and microphones 324a and 324b of earpiece 320. DSP module 330 performs digital signal processing in accordance with the first set of parameters for the speakerphone mode and with the second set of parameters for the earpiece mode.

Figure 4:
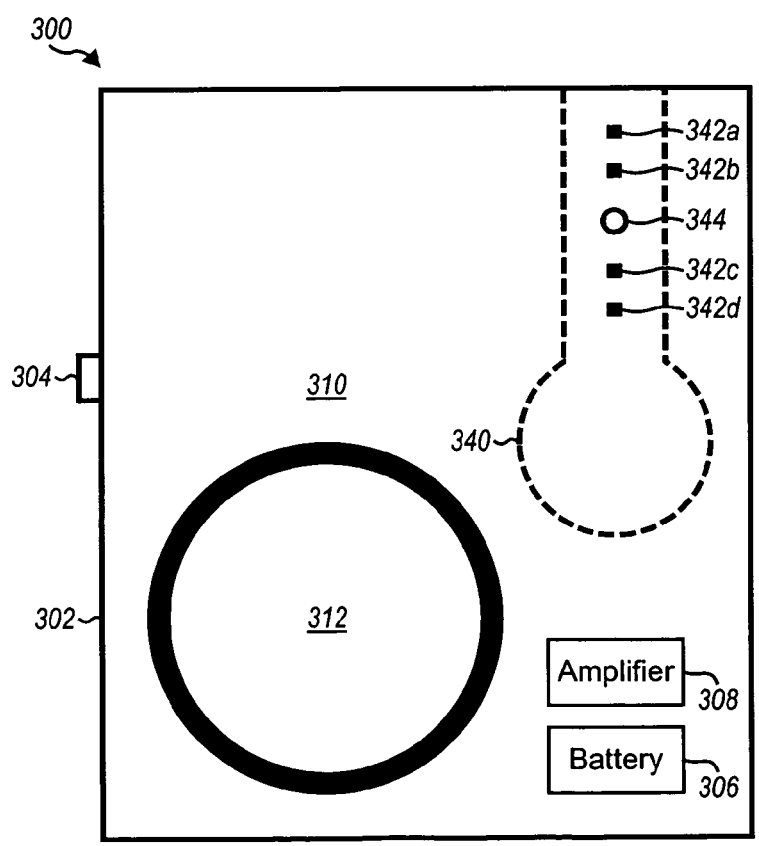

FIG. 4 shows a front view of apparatus 300 in FIG. 3 with earpiece 320 removed. Three pin connectors 342a through 342c are used to electrically couple wireless module 328 and DSP module 330 within earpiece 320 to loudspeaker 312, main battery 306, and circuit ground, respectively, within speakerphone case 302. Pin connector 342d is used to switch between the first set of parameters for the speakerphone mode and the second set of parameters for the earpiece mode. An opening 344 is formed through the loudspeaker chamber to microphone 324b in earpiece 320 to allow microphone 324b to receive more sound from loudspeaker 320. The sound picked up by microphone 324b is used for echo cancellation.

FIG. 5 shows a front view of earpiece 120 for apparatus 100 in FIG. 1. Earpiece 120 includes loudspeaker 122, two microphones 124a and 124b, wireless module 128, and DSP module 130. Wireless module 128 provides wireless communication via a communication channel such as Bluetooth, IEEE 802.11, and so on. DSP module 130 performs digital signal processing and may be implemented as described below. Earpiece 120 may also include other components.

FIG. 6 shows a side view of earpiece 120 for apparatus 100. Within earpiece 120, two microphones 124a and 124b are mounted within microphone boots 126a and 126b made of acoustic opaque resilient material. Six pin connectors 132a through 132f couple to six pin connectors 142a through 142f, respectively, in speakerphone case 102. When earpiece 120 is mounted in slot 140, connectors 132a through 132e couple wireless module 128 and DSP module 130 within earpiece 120 to loudspeaker 112, microphones 114a and 114b, main battery 106, and circuit ground, respectively, within speakerphone case 102. Pin connector 132f is used to switch between the first and second sets of parameters for DSP module 130.

FIG. 7 shows a side view of earpiece 320 for apparatus 300 in FIG. 3. Within earpiece 320, two microphones 324a and 324b are mounted within microphone boots 326a and 326b made of acoustic opaque resilient material. Four pin connectors 332a through 332d couple to four pin connectors 342a through 342d, respectively, in speakerphone case 302. When earpiece 320 is mounted in slot 340, connectors 332a through 332c couple wireless module 328 and DSP module 330 within earpiece 320 to loudspeaker 312, main battery 306, and circuit ground, respectively, within speakerphone case 302. Pin connector 332d is used to switch between the first and second sets of parameters for DSP module 330. An opening 334 is formed at the back of microphone boot 326b to allow reference microphone 324b to receive more sound from loudspeaker 312 within speakerphone case 302.

Earpieces 120 and 320 may each be used in the earpiece mode or the speakerphone mode. In the earpiece mode, earpiece 120 or 320 is placed over a user's ear, and loudspeaker 122 or 322 generates sufficient sound volume for the user given the close proximity to the user's ear. In the speakerphone mode, earpiece 120 or 320 is placed some distance away from the user's ear, and loudspeaker 122 or 322 generates higher sound volume for the user. A mode switch can switch between the earpiece mode and the speakerphone mode for the earpiece.

Figure 8:
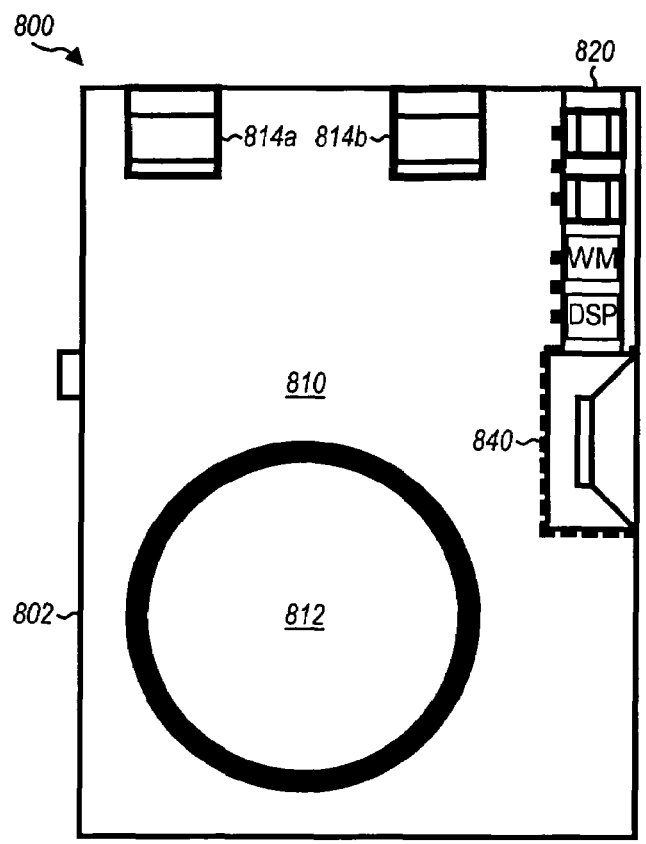
FIGS. 8 and 9 show front views of the hands-free apparatuses in FIGS. 1 and 3, respectively, with the earpiece mounted in a different orientation.

FIG. 8 shows a front view of an embodiment of a hands-free voice communication apparatus 800. Apparatus 800 includes all of the elements of apparatus 100 in FIG. 1, such as a standalone speakerphone 810 with two microphones 814a and 814b and an earpiece 820. For this embodiment, earpiece 820 is mounted in a slot 840 formed within a speakerphone case 802 such that the earpiece is facing the left side. Earpiece 820 may also be mounted by facing the right side. Mounting earpiece 820 in different orientation may simplify the mounting the earpiece to the speakerphone case, simplify use of the microphones for certain signal processing algorithms, and so on.

Figure 9:
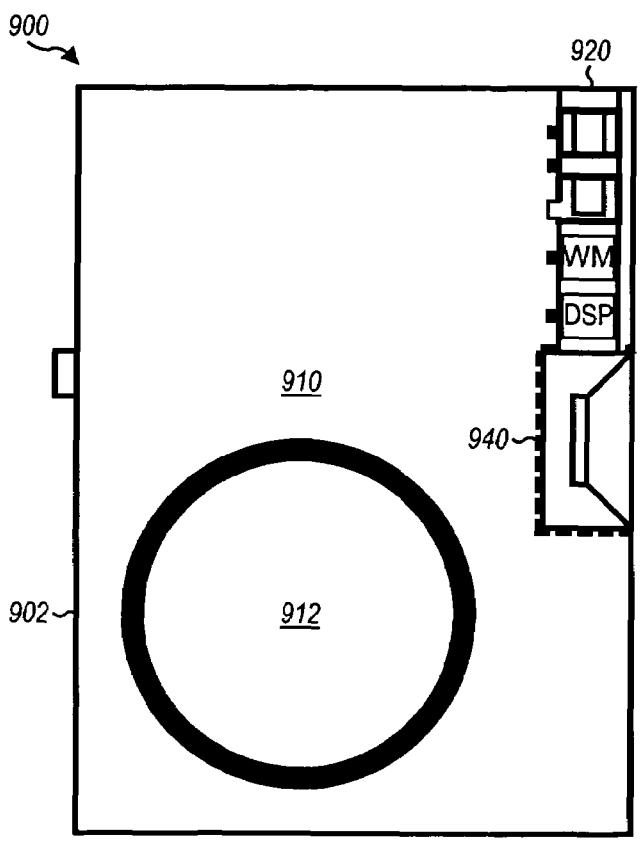

FIG. 9 shows a front view of an embodiment of a hands-free voice communication apparatus 900. Apparatus 900 includes all of the elements of apparatus 300 in FIG. 3, including a standalone speakerphone 910 without any microphone and an earpiece 920. For this embodiment, earpiece 920 is mounted in a slot 940 formed within a speakerphone case 902 such that the earpiece is facing the left side. Earpiece 920 may also be mounted by facing the right side.

Figure 10:
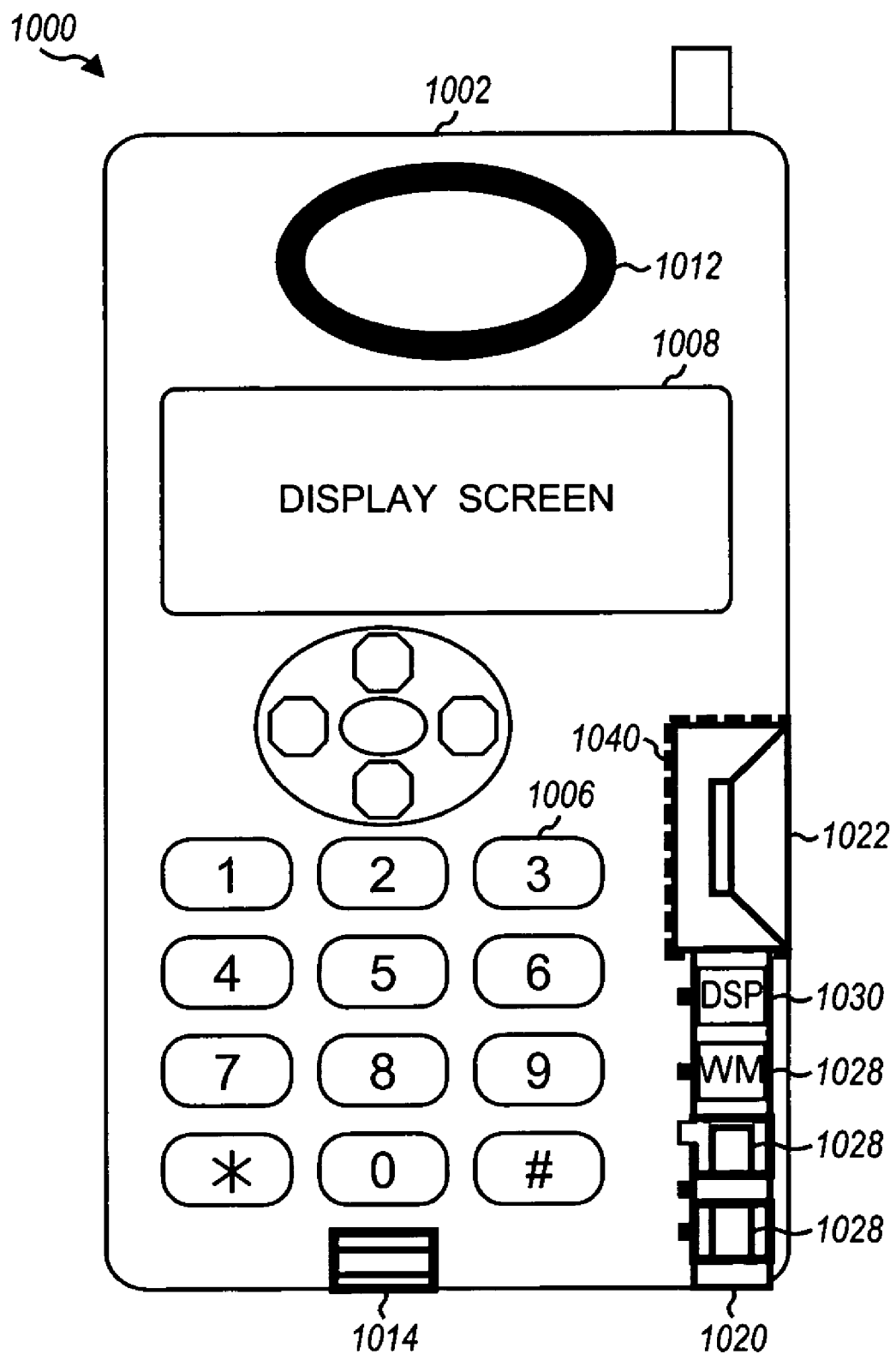
FIG. 10 shows a front view of a hands-free apparatus implemented with a handset and an integrated earpiece.

FIG. 10 shows a front view of an embodiment of a hands-free voice communication apparatus 1000, which is a handset 1002 with an integrated earpiece 1020. Handset 1002 includes a keypad 1006, a liquid crystal display (LCD) 1008, a loudspeaker 1012, a microphone 1014, a main battery (not shown in FIG. 10), a power amplifier for loudspeaker 1012 (also not shown), and other pertinent modules and components. Earpiece 1020 includes a small loudspeaker 1022, two microphones 1024a and 1024b, a wireless module 1028, and a DSP module 1030. Earpiece 1020 is mounted in a slot 1040 formed within handset 1002 such that the earpiece is facing the left side. Earpiece 1020 may also be mounted to face the front side, as shown in FIGS. 1 and 3, or some other orientation.

Earpiece 1020 is functional when removed from handset 1002. In an earpiece mode, wireless module 1028 communicates with handset 1002 via Bluetooth, Wi-Fi, or some other wireless protocol. Handset 1002 communicates with a wireless (e.g., cellular) communication network. Handset 1002 is functional when earpiece 1020 is mounted in handset 1002. A key on handset 1002 may be used to switch between a speakerphone mode and a handset mode. In the handset mode, which is for normal handheld communication with handset 1002, DSP module 1030 inside earpiece 1020 is coupled to the main battery and to the power amplifier that drives loudspeaker 1012 in handset 1002. In the speakerphone mode, which is for hands-free communication with handset 1002, DSP module 1030 is also coupled to the main battery and to the power amplifier that drives loudspeaker 1012. A first set of parameters is used for the speakerphone mode, and a second set of parameters is used for the handset mode.

FIGS. 1 through 10 show three specific embodiments of a hands-free voice communication apparatus. The hands-free apparatus may also be implemented in various manners, with any number of loudspeakers and any number of microphones for the speakerphone, and with any number of loudspeakers and any number of microphones for the earpiece. The DSP module may be implemented within the earpiece, as shown in the figures above. Alternatively or additionally, a DSP module may be implemented within the speakerphone.

A hands-free voice communication apparatus with integrated speakerphone and earpiece is highly desirable. For privacy purpose, a user may use the earpiece for communication by simply removing the earpiece from the speakerphone case. For convenience and ease of use, the user may use speakerphone for communication by simply placing the earpiece back into the speakerphone case. Since the loudspeaker and the microphones are place close together for both the speakerphone and the earpiece, echo is typically a major problem. Digital signal processing may be used to remove as much echo as possible and to achieve good voice quality.

Figure 11:
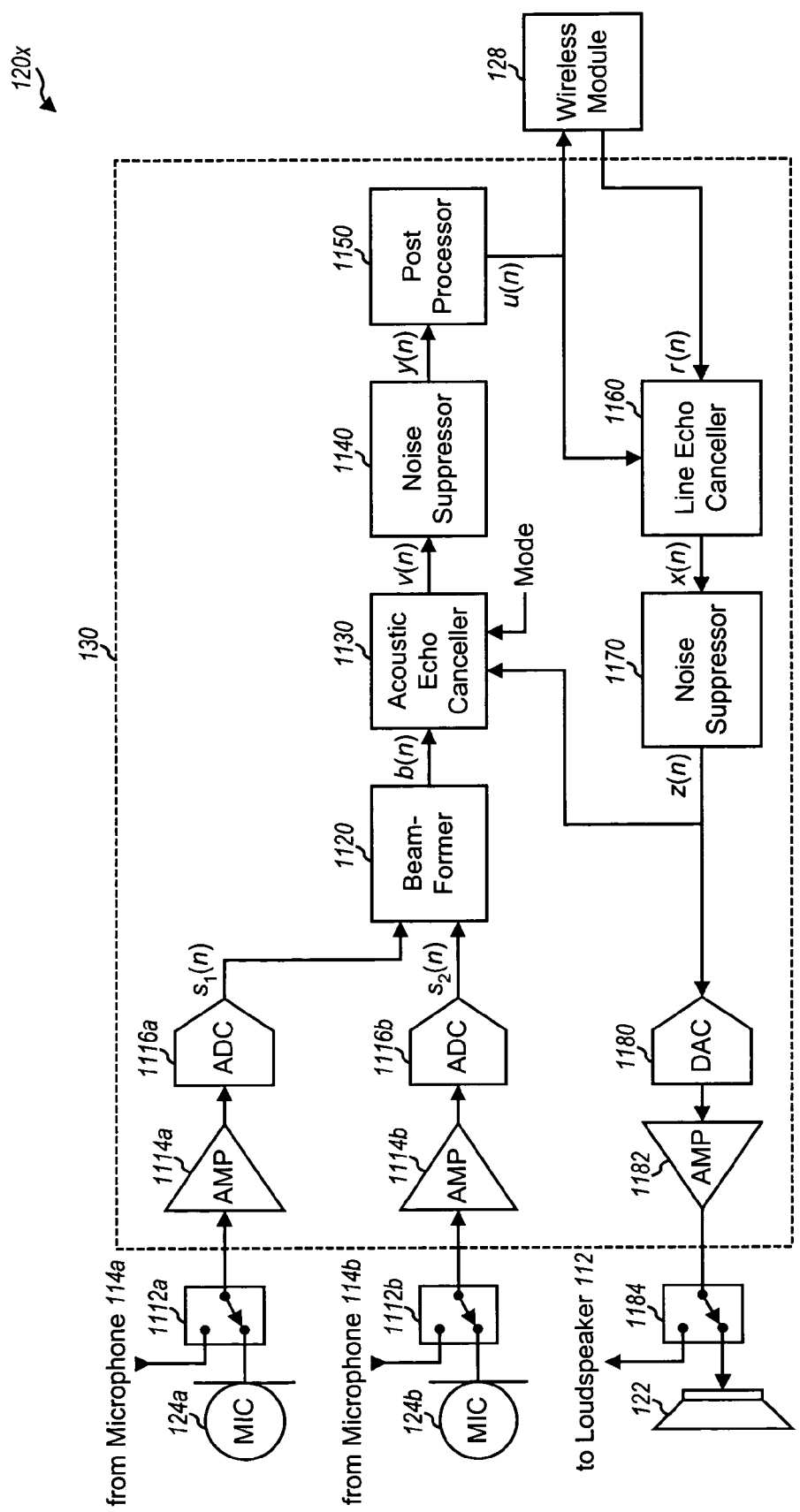
FIG. 11 shows a block diagram of the earpiece for the hands-free apparatus in FIG. 1.

FIG. 11 shows a block diagram of an earpiece 120x, which is an embodiment of earpiece 120 in FIGS. 1 and 5. Earpiece 120x includes loudspeaker 122, microphones 124a and 124b, wireless module 128, and DSP module 130. The following description is for the earpiece mode in which DSP module 130 receives and processes input signals from microphones 124a and 124b and provides an output signal to loudspeaker 122.

For near-end speech, microphones 124a and 124b receive sound signals and provide the near-end input signals via switches 1112a and 1112b to amplifiers 1114a and 1114b, respectively, within DSP module 130. Each amplifier 1114 amplifies its input signal and provides an amplified near-end signal. An analog-to-digital converter (ADC) 1116a receives and digitizes the first amplified near-end signal from amplifier 1114a and provides a main signal $s_1(n)$. An ADC 1116b receives and digitizes the second amplified near-end signal from amplifier 1114b and provides a secondary signal $s_2(n)$. A beam-former 1120 receives the main and secondary signals, performs beamforming on the two signals, and provides a beamformed signal b(n). An acoustic echo cancellation unit 1130 receives the beamformed signal b(n), a far-end output signal z(n) from a noise suppression unit 1170, and a Mode signal that indicates whether to use the first or second set of parameters. Acoustic echo cancellation unit 1130 performs acoustic echo cancellation in accordance with the selected set of parameters to remove echo from loudspeaker 122 and provides an echo-canceled near-end signal v(n).

A noise suppression unit 1140 receives the echo-canceled near-end signal v(n), performs noise suppression to remove noise in the v(n) signal, and provides a noise-suppressed near-end signal y(n). A post-processor 1150 receives the noise-suppressed near-end signal y(n), performs post-processing, and provides a processed near-end signal u(n), which is a digital data stream, to wireless module 128. Wireless module 128 provides communication via a wireless communication channel such as Bluetooth, Wi-Fi, and so on.

For far-end speech, wireless module 128 receives a far-end signal via the wireless communication channel and provides the received far-end signal r(n) to a line echo cancellation unit 1160. Unit 1160 also receives the processed near-end signal u(n) from post-processor 1150, performs line echo cancellation on the received far-end signal r(n) to remove echo from near-end voice, and provides an echo-canceled far-end signal x(n). Noise suppression unit 1170 receives the echo-canceled far-end signal, performs noise suppression to remove noise, and provides the far-end output signal z(n). The far-end output signal z(n) is converted to analog by a digital-to-analog converter (DAC) 1180. An amplifier 1182 amplifies the analog signal and provides an amplified far-end output signal via a switch 1184 to loudspeaker 122.

For the speakerphone mode, DSP module 130 receives and processes near-end signals from microphones 114a and 114b within speakerphone 110 and provides the far-end output signal to loudspeaker 112.

The various processing blocks in FIG. 11, such as beam-former 1120, acoustic echo cancellation unit 1130, noise suppression unit 1140, line echo cancellation unit 1160, and noise suppression unit 1170 may be implemented in various manners known in the art. Exemplary techniques for performing beamforming, echo cancellation, and noise suppression are described in the following commonly assigned U.S. patent applications:

Ser. No. 10/193,689, entitled "Channel Control and Post Filter for Acoustic Echo Cancellation," filed Jul. 10, 2002;

Ser. No. 10/371,991, entitled "Method and System for Nonlinear Echo Suppression," filed Feb. 21, 2003;

Ser. No. 10/371,150, entitled "Small Array Microphone for Acoustic Echo Cancellation and Noise Suppression," filed Feb. 21, 2003; and Ser. No. 10/601,055, entitled "Small Array Microphone for Beam-Forming and Noise Suppression," filed Jun. 20, 2003.

These patent applications are incorporated herein by reference.

The beam-forming, echo cancellation, and noise suppression may be implemented by various means. For example, the beam-forming, echo cancellation, and noise suppression may be implemented in hardware, software, or a combination thereof. For a hardware implementation, the processing units used to perform echo cancellation and noise suppression may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A hands-free voice communication apparatus comprising:
 a speakerphone comprising a first loudspeaker; and
 an earpiece comprising a second loudspeaker, at least one microphone, a wireless module, and a digital signal processing (DSP) module, the wireless module providing wireless communication with a communication device, and the DSP module performing digital signal processing for both the speakerphone and the earpiece, wherein the digital signal processing includes beam-forming, echo cancellation, and noise suppression.

2. The apparatus of claim 1, further comprising:
 a speakerphone case for holding the speakerphone and the earpiece; and
 a loudspeaker chamber formed within the speakerphone case, wherein the first loudspeaker is mounted within the loudspeaker chamber.

3. The apparatus of claim 2, further comprising:
 an opening formed behind one of the at least one microphone for the earpiece to receive sound from the loudspeaker chamber.

4. The apparatus of claim 1, wherein the DSP module is operative to perform digital signal processing in accordance with a first set of parameter for the speakerphone and with a second set of parameters for the earpiece.

5. The apparatus of claim 1, wherein the DSP module is operative to perform acoustic echo cancellation to remove echo from a near-end voice signal.

6. The apparatus of claim 1, wherein the DSP module is operative to perform noise suppression for a near-end voice signal.

7. The apparatus of claim 1, wherein the DSP module is operative to perform line echo cancellation to remove echo from a far-end voice signal.

8. The apparatus of claim 1, wherein the DSP module is operative to perform noise suppression for a far-end voice signal.

9. The apparatus of claim 1, wherein the wireless module is operative to communicate with the communication device via Bluetooth.

10. The apparatus of claim 1, wherein the wireless module is operative to communicate with the communication device via Wi-Fi.

11. The apparatus of claim 1, wherein the speakerphone is a standalone speakerphone.

12. The apparatus of claim 1, wherein the speakerphone is part of the communication device.

13. The apparatus of claim 1, wherein the earpiece is operable to in an earpiece mode and a speakerphone mode.

14. The apparatus of claim 1, wherein the speakerphone further comprises at least one microphone.

15. The apparatus of claim 14, wherein each of the at least one microphone for the speakerphone is an omni-directional microphone.

16. The apparatus of claim 1, wherein the speakerphone further comprises a plurality of first microphones that include at least one main microphone and at least one reference microphone.

17. The apparatus of claim 16, wherein the earpiece comprises a plurality of second microphones that include at least one main microphone and at least one reference microphone.

18. The apparatus of claim 17, wherein the DSP module is operative to process input signals from the plurality of first microphones when the speakerphone is operational and to process input signals from the plurality of second microphones when the earpiece is operational.

19. The apparatus of claim 17, wherein the DSP module is operative to provide an output signal to the first loudspeaker when the speakerphone is operational and to provide the output signal to the second loudspeaker when the earpiece is operational.

20. A hands-free voice communication apparatus comprising:
a speakerphone comprising a first loudspeaker and a plurality of first microphones; and
an earpiece comprising a second loudspeaker, a plurality of second microphones, a wireless module, and a digital signal processing (DSP) module, the wireless module providing wireless communication with a communication device, and the DSP module performing digital signal processing for both the speakerphone and the earpiece.

21. A hands-free voice communication apparatus comprising:
a communication device comprising a first loudspeaker and a first set of at least one microphone and further operative to provide wireless communication with a wireless communication network; and
an earpiece comprising a second loudspeaker, a second set of at least one microphone, a wireless module, and a digital signal processing (DSP) module, the wireless module providing wireless communication with the communication device, and the DSP module performing digital signal processing for both the first loudspeaker and the first set of at least one microphone and the second loudspeaker and the second set of at least one microphone, wherein the digital signal processing includes beam-forming, echo cancellation, and noise suppression.

22. A hands-free voice communication apparatus comprising:
a speakerphone comprising a slot;
an earpiece detachably disposed in the slot;
a digital signal processing (DSP) module for performing digital signal processing for both the speakerphone and the earpiece, the digital signal processing including beam-forming, echo cancellation, and noise suppression; and
connectors interconnecting the speakerphone and the earpiece when the earpiece is disposed in the slot.

23. The hands-free voice communication apparatus as claimed in claim 22, wherein the earpiece includes an opening, a loudspeaker, and a reference microphone, and the reference microphone receives sound from the loudspeaker via the opening.

24. The hands-free voice communication apparatus as claimed in claim 22, wherein the speakerphone further comprises a speakerphone case, and the slot is formed within the speakerphone case.

25. A hands-free voice communication apparatus comprising:
a speakerphone comprising a first loudspeaker and first array microphones;
an earpiece, detachable disposed in the speakerphone, comprising a second loudspeaker, second array microphones and a digital signal processing (DSP) module, wherein the DSP module performs beam-forming, echo cancellation, and noise suppression for the first array microphones in a speakerphone mode, and performs beam-forming, echo cancellation, and noise suppression for the second array microphones in an earpiece mode.

26. The hands-free voice communication apparatus as claimed in claim 25 further comprising a wireless module receiving a far-end acoustic signal, wherein in the speakerphone mode the DSP module further performs noise suppression and echo cancellation on the far-end acoustic signal and the first loudspeaker outputs the far-end acoustic signal.

27. The hands-free voice communication apparatus as claimed in claim 25 further comprising a wireless module receiving a far-end acoustic signal, wherein in the earpiece mode the DSP module further performs noise suppression and echo cancellation on the far-end acoustic signal and the second loudspeaker outputs the far-end acoustic signal.

28. The hands-free voice communication apparatus as claimed in claim 25 further comprising a wireless module wherein in the speakerphone mode the DSP module processes a first near-end acoustic signal received by the first array microphones to obtain a first processed near-end acoustic signal, and the wireless module sends out the first processed near-end acoustic signal; and in the earpiece mode the DSP module processes a second near-end acoustic signal received by the second array microphones to obtain a second processed near-end acoustic signal, and the wireless module sends out the second processed near-end acoustic signal.

* * * * *